United States Patent [19]

Takatori et al.

[11] Patent Number: 4,868,874

[45] Date of Patent: Sep. 19, 1989

[54] ECHO CANCELLER

[75] Inventors: Hiroshi Takatori, Ottawa, Canada; Motohiro Kokumai, Kokubunji; Tatsuko Shinozuka, Hachioji, both of Japan

[73] Assignee: Hitachi, Ltd., Tokyo, Japan

[21] Appl. No.: 38,938

[22] Filed: Apr. 16, 1987

[30] Foreign Application Priority Data

Apr. 18, 1986 [JP] Japan .................................. 61-87913
Aug. 13, 1986 [JP] Japan ................................ 61-188446

[51] Int. Cl.$^4$ ............................................ H04B 3/23
[52] U.S. Cl. ..................................... 379/411; 370/32.1
[58] Field of Search ...................... 379/406, 410, 411; 370/32, 32.1; 364/724; 333/18, 28 R

[56] References Cited

U.S. PATENT DOCUMENTS

| | | | |
|---|---|---|---|
| 4,349,889 | 9/1982 | van den Elzen et al. | 370/32.1 X |
| 4,571,719 | 2/1986 | Carlquist et al. | 370/32 |
| 4,679,230 | 7/1987 | Lassaux et al. | 379/411 |
| 4,715,064 | 12/1987 | Claessen | 379/392 |

FOREIGN PATENT DOCUMENTS

| | | | |
|---|---|---|---|
| 0211338 | 11/1984 | Japan | 370/32.1 |
| 2109207 | 5/1983 | United Kingdom | 370/32.1 |
| 2109208 | 5/1983 | United Kingdom | 370/32.1 |

OTHER PUBLICATIONS

"Digital Echo Cancellation for Baseband Data Transmission" N. Verhoeckx et al., IEEE Transactions on Acoustics, Speech and Signal Processing, vol. AS-SP-27, No. 6, Dec. 1979, pp. 768-781.

Primary Examiner—Jin F. Ng
Assistant Examiner—Randall S. Vaas
Attorney, Agent, or Firm—Antonelli, Terry & Wands

[57] ABSTRACT

An echo canceller which cancels an echo by generating a replica of echo from the transmit data when the signal from the transmit line appears as an echo signal on the receive line, and subtracting the replica of echo from the echo signal in a circuit for connecting a transmit line and receive line to the full duplex transmission line through a hybrid circuit. The echo canceller for generating a replica of echo is composed of the first circuit which generates a replica of echo of limited length and a second circuit in which generates a replica of echo for eliminating the residual echo that is not cancelled by the first circuit.

6 Claims, 7 Drawing Sheets

| | S1(m) | S2(m) | S3(m) | S4(m) |
|---|---|---|---|---|
| 0 0 0 1 | 0 − + (0) | 0 − + (0) | 0 − + (0) | 0 − + (0) |
| 0 1 1 1 | − 0 + (0) | − 0 + (0) | − 0 + (0) | − 0 + (0) |
| 0 1 0 0 | − + 0 (0) | − + 0 (0) | − + 0 (0) | − + 0 (0) |
| 0 0 1 0 | + − 0 (0) | + − 0 (0) | + − 0 (0) | + − 0 (0) |
| 1 0 1 1 | + 0 − (0) | + 0 − (0) | + 0 − (0) | + 0 − (0) |
| 1 1 1 0 | 0 + − (0) | 0 + − (0) | 0 + − (0) | 0 + − (0) |
| 1 0 0 1 | + − + (1) | + − + (1) | + − + (1) | − − − (−3) |
| 0 0 1 1 | 0 0 + (1) | 0 0 + (1) | 0 0 + (1) | − − 0 (−2) |
| 1 1 0 1 | 0 + 0 (1) | 0 + 0 (1) | 0 + 0 (1) | − 0 − (−2) |
| 1 0 0 0 | + 0 0 (1) | + 0 0 (1) | + 0 0 (1) | 0 − − (−2) |
| 0 1 1 0 | − + + (1) | − + + (1) | − − + (−1) | − − + (−1) |
| 1 0 1 0 | + + − (1) | + + − (1) | + − − (−1) | + − − (−1) |
| 1 1 1 1 | + + 0 (2) | 0 0 − (−1) | 0 0 − (−1) | 0 0 − (−1) |
| 0 0 0 0 | + 0 + (2) | 0 − 0 (−1) | 0 − 0 (−1) | 0 − 0 (−1) |
| 0 1 0 1 | 0 + + (2) | − 0 0 (−1) | − 0 0 (−1) | − 0 0 (−1) |
| 1 1 0 0 | + + + (3) | − + − (−1) | − + − (−1) | − + − (−1) |

ECHO CANCELLER

BACKGROUND OF THE INVENTION

(1) Field of the Invention

The present invention relates to an echo canceller for data transmission, and more specifically to an echo canceller which generates a replica of echo from the sending data in case the sending data appears on the receive line on the occasion of connecting the transmit and receive lines to a 2-wire lead through a hybrid circuit such as a 2-wire/4-wire interface used in a telephone system.

(2) Description of the Prior Art

An echo canceller of the prior art has been required to have a number of taps of a transversal filter to from a replica of echo for echo cancelling with high accuracy as described in IEEE, Proceedings of GLobe Com' 85 pp 1311–1316). However, since the amount of hardware is proportional to $2^N$ when the tap length is N, if N=16, for example, the capacity of 66 k words of RAM is required for generating the coefficient. Namely, when one word is composed of at least 10 bits, a total of 660 kbits are required. Accordingly, it is no longer impossible to load a RAM into a chip even when the 1.3 μm process is used and considerations for simplification of the device has not been taken into account.

In the case where a replica of echo generator having a short impulse response is used, and since residual echo having a sharp rising characteristic is generated when the replica of echo is subtracted from the echo, noise is generated if the residual echo is applied to a line equalizer because the equalizer has a high frequency gain at a high frequency band.

SUMMARY OF THE INVENTION

It is an object of the present invention to provide an echo canceller which can eliminate, with simplified apparatus, residual echo which cannot be eliminated by a replica echo generator of the limited time length.

In order to achieve the object as described above, the present invention discloses an echo canceller where the replica of echo is generated from the transmit data signal and the replica of echo is subtracted from the echo appearing on the receive line when the transmit line and the receive line are connected to a 2-wire system line through a hybrid circuit. Moreover, in this echo canceller, the apparatus for generating the replica of echo is composed of a first circuit for generating a replica of echo in the limited length and a second circuit for generating a replica of echo in order to eliminate echoes which are not eliminated by said first circuit and echoes are substantially eliminated by the first and second circuit for generating a replica of echo.

The problem concerning the residual echo is not resulting from the residual echo itself but from the fact that a waveform of the residual echo becomes an impulse noise having a high amplitude due to a line equalizer. This results in code discrimination error in data transmission.

In the present invention, the second replica of echo generator solves the aforementioned problem by gently changing the rising edge of the residual echo waveform immediately after the end of replica of the echo in the limited length without making exactly zero the residual echo at all times. Namely, the characteristic of the line equalizer that provides a large gain in a high frequency which results in a large output for a quick signal change and only a small output for a gentle signal change is utilized. When the transmission distance is comparatively short, a merit of the preset invention cannot be obtained because the gain of the line equalizer is almost the same in high and low frequency ranges. However, problems do not occur since the signal itself is at a high level.

Above description is adopted to a structure where the line equalizer is used for the signal from which the echo is cancelled, but the present invention may also be adopted to a structure where an echo is eliminated from the output of the line equalizer.

The abovementioned and other features and objects of this invention will become more apparent by reference to the following description taken in conjunction with accompanying drawings.

DETAILED DESCRIPTION OF THE EMBODIMENTS

Figure 1:
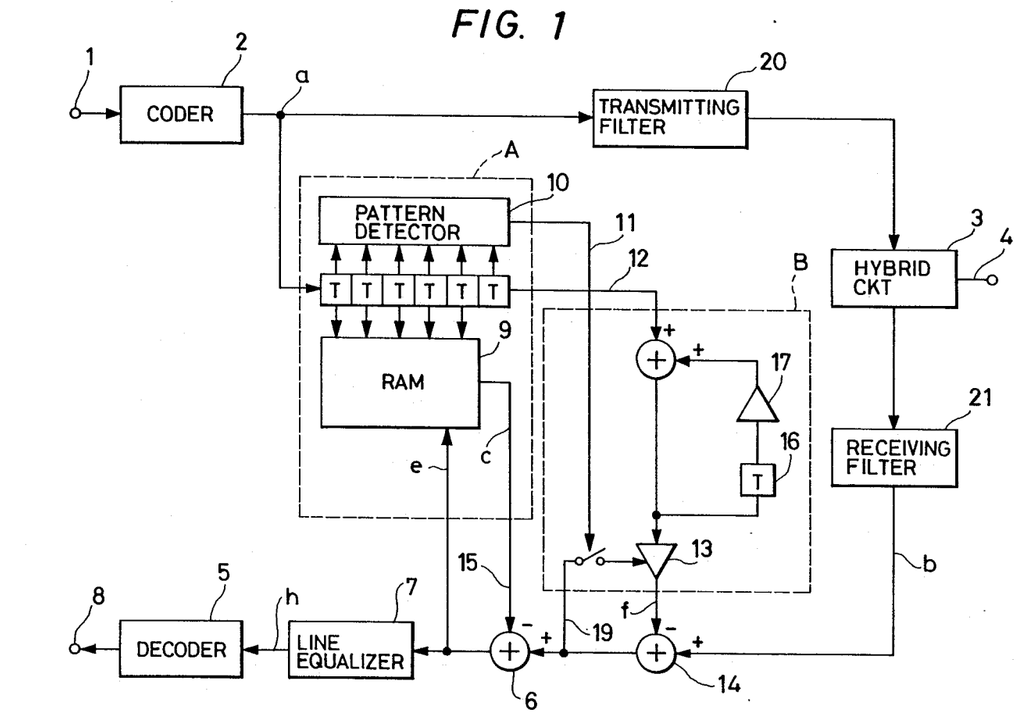
FIG. 1 is a block diagram illustrating the structure of 2-wire/4-wire interface comprising the echo canceller.

FIG. 1 is a block diagram illustrating an embodiment of an echo canceller of the present invention.

In FIG. 1, an input terminal 1, encoder 2 and transmitting filter 20 form a transmitting line of a 4-wire system transmission line. A digital signal which is transmit data of the output of the encoder 2 is transmitted to a 2-wire line 4 for full-duplex transmission through hybrid circuit 3.

A receiving filter 21, adders 14, and 6, line equalizer 7, and decoder 5 are provided in the receive line of the 4-wire system. The digital data signal transmitted from the 2-wire line 4 is received by the receiving filter 21 through the hybrid circuit 3.

The blocks A and B generate a replica of echo. The Block A generates a first replica of echo of the limited length, while block B, generates a second replica of echo after the period of the first replica of echo of a limited length.

The block A which generates the first replica of echo has a function similar to that of known table look-up echo canceller and transversal filter, and, directly connects in series a plurality of delay elements each of which has the delay time of a time slot (Baud Rate Timing) (or bit period) of a transmission signal. The block A generates the first replica of echo from the RAM memory 9 with its tap output used as an address.

Figure 2:
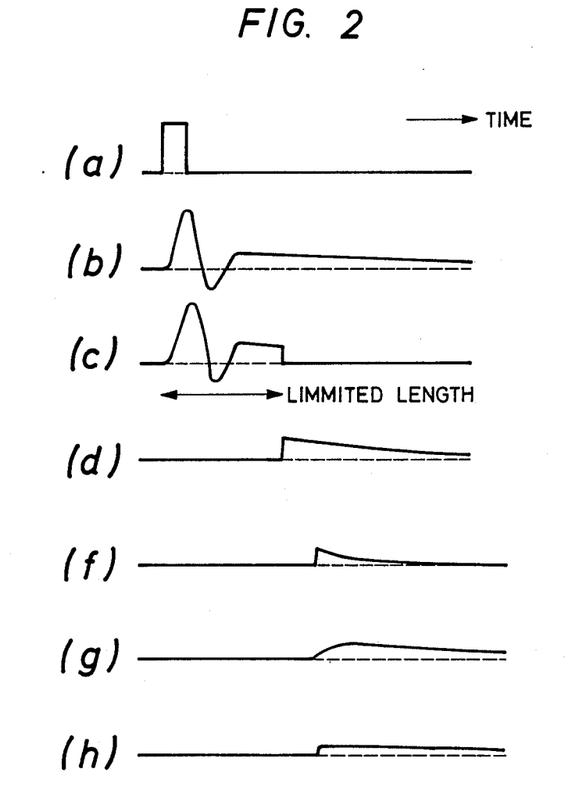
FIG. 2 illustrates waveforms at each portion in the above embodiment shown in FIG. 1.

For simplification of explanation, the transmitting data is assumed as a single pulse as shown in (a) of FIG. 2.

The echo which flows through the transmitting filter 20, hybrid circuit 3 and receiving filter 21 is indicated as (b).

The first replica of echo generating circuit of block A generates the replica of echo (c) of limited length (time slot 5) and it is subtracted from the echo (b). Thereby the residual echo (d) is obtained. In the present invention, the second replica of echo (f) approximated to the residual echo (d) is generated by the second replica of echo generator of block B having a simplified structure. In this embodiment, the second replica of echo generator is formed by a first order recursive digital filter and receives an input of a signal having a constant limited length obtained by delaying the transmit data by the first replica of echo generator.

The first order recursive digital filtr comprises an adder which adds the delayed input signal and a feedback signal sent from a feedback circuit including a coefficient circuit 17, and a delay element 16 which delays an output of the adder for the delay time which is equal to the basic period T of the transmission data. The coefficient circuit 17 iputs an output of the delay element 16. Also included in block B is a coefficient circuit 13 which obtains the second replica of echo by multiplying a coefficient to an output of the adder. The adder 14 subtracts the (F) element from the echo (b) as shown in FIG. 2 and the line 19 detects a pattern of transmission data by a pattern detector in the first replica of echo generator A and sets the coefficient of the coefficient circuit 13 to the optimum value by the signal 11.

The first replica of echo generating circuit A is the same as the circuit known previously. The first replica of a echo (c) of limited length period is read from the random access memory (RAM) 9 and it is subtracted further from the echo from which the second replica of echo has been subtracted. Thereby, the echo is eliminated.

In the use of the echo canceller, said replica of echo generator B is trained. While it is operated, accuracy and operating speed may be improved by executing the training of the first replica of echo generator A.

Operations of the above embodiment are explained in greater detail.

As previously known, the amount of echo of the transversal type replica of echo generator A may be set (training) with an impulse response of echo and correction is carried out, during transmission of transmit data, from the correlation of transmit signal and echo. In this embodiment, the training of the second replica of echo generator B is carried out first as the echo, and while it is operated, training of the first replica of echo generator is then carried out. In this embodiment, it is effective when the replica of echo generator A is formed by RAM (random access memory).

Figure 3A:
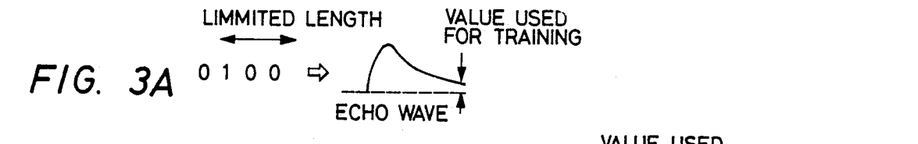
FIGS. 3A, 3B and 3C illustrate waveforms for explaining operations of an echo canceller of the present invention.
Figure 3B:
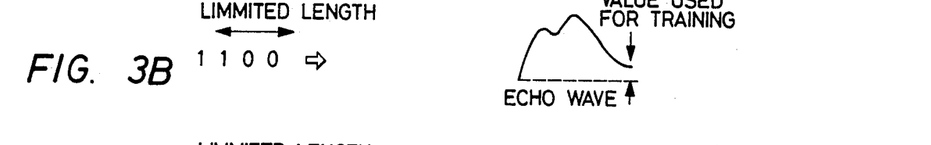
Figure 3C:
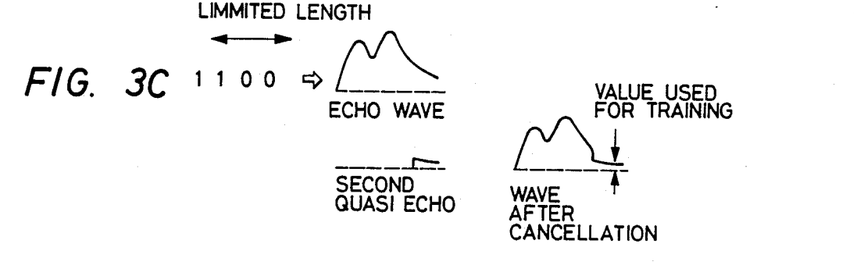

FIGS. 3A, 3B and 3C illustrate waveforms for explaining operations, and length of the first replica of echo as indicated by 3 time slots.

FIG. 3A is an echo waveform when the transmit data is "0100". FIG. 3B is an echo waveform when the transmit data is "1100". When the second replica of echo generator B is not provided, and since the length of replica of echo is limited, the echo level is different in accordance with the past transmit data in addition to the length of replica of echo, not only generating error in the training information but also requiring many times of training for making small error. Moreover, even when an echo is cancelled by the value trained, echo level is different due to the preceding transmit data, residual echo may be generated.

According to this embodiment illustrated in FIG. 1, since the preceding echo as shown in FIG. 3C is cancelled by the second replica of echo, it becomes constant irrespective of existence of preceding echo and accuracy and speed of training may be improved. Particularly, the present embodiment is effective in the training of the RAM type replica of echo generator because the cyclic codes are used.

The second replica of echo generator B of FIG. 1 adds the signal obtained by multiplying a coefficient to the data before one time slot to the transmit data 12 described previously and provides those obtained by mulitplying the coefficient to the value in the coefficient circuit 13 as the second replica of echo. The coefficient circuit 13 detects the particular code series pattern (for example, "10000...1") with a pattern detecting circuit 10 and the coefficient value is corrected by the detected signal because of the following reason.

Since the second replica of echo generator B generates the replica of echo after the period corresponding to the first replica of echo generated, the echo by the random transmit signal is not cancelled immediately after the transmission and becomes very large. As a result, a high precision correlation detector and a longer period for averaging are required for obtaining correlation between the echo and past transmit data of limited length.

The one characteristic of the present embodiment is that a high stable and accurate echo canceller with the minimum series length may be formed without the interference of the two replica of echo correction loops by using the receiving signal not cancelled by the first replica of echo of limited length and cancelled by the second replica of echo in the output side of adder 14 and in the input side of adder 6.

According to this embodiment, the residual echo of the line equalizer 7 may be improved by about 19 dB, and when the first replica of echo generator A using RAM is formed, memory capacity may be curtailed to $\frac{1}{8}$–1/64 and the training time may also be curtailed to $\frac{1}{8}$–1/64 by using RAM and simultaneously accuracy may be improved by about 6 dB.

In above explanation, training is also carried out in the second replica of echo generator B, but it is also allowed that the final value of impulse response of the first replica of echo generator A is used as the initial value of the impulse response of the second replica of echo generator. Namely, the final value of the first replica of echo must be continuous to the initial value of the second replica of echo with necessary accuracy. Therefore, the training for the second replica of echo generator may be omitted or curtailed by using the final value of the impulse response of the first replica of echo generator after the training is used as the initial value of said second replica of echo.

Figure 4:
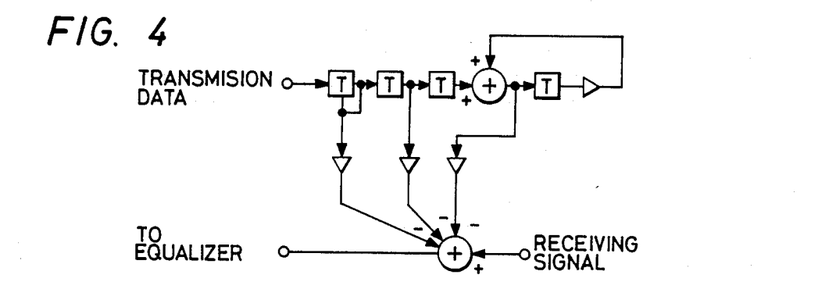
FIGS. 4, 5 and 6 illustrate structures of other embodiments of echo cancellers of the present invention.

FIG. 4 illustrates a structure of the major part of another embodiment of the echo canceller to which the present invention pertains. This embodiment is formed by the first replica of echo generator in the limited length including three delay elements and an apparatus which generates the second replica of echo after the end of the first replica of echo. The final value of impulse response of the former matches the initial value of the latter which is necessary for accuracy.

Figure 5:
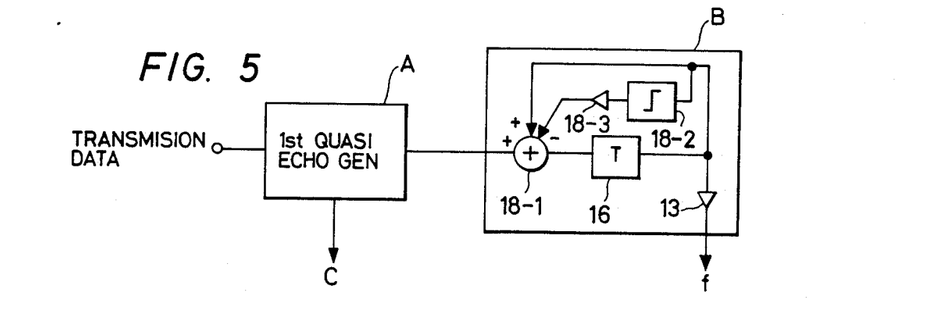

FIG. 5 illustrates a structure of another embodiment of an echo replica generator. This embodiment is different from that of FIG. 1 only in the second replica of echo generator B. The element similar to that of embodiment of FIG. 1 is given like reference numbers and explanation of these elements is omitted here. The feedback circuit of first order recursive filter feeds back a part of the output of delay element 16 directly to the adder 18-1 and a part of it to the adder 18-1 through the comparator 18-2 and coefficient circuit 18-3. Namely an amount of feedback of the feedback circuit is assumed as Out, an output of delay element 16 as S and coefficient of the coefficient circuit 13-3 as K. The following relationship may be attained.

$$\text{Out} = \begin{array}{ll} S - k & (\text{in case } S > 0) \\ 0 & (\text{in case } S = 0) \\ S + k & (\text{in case } S < 0) \end{array}$$

Figure 6:
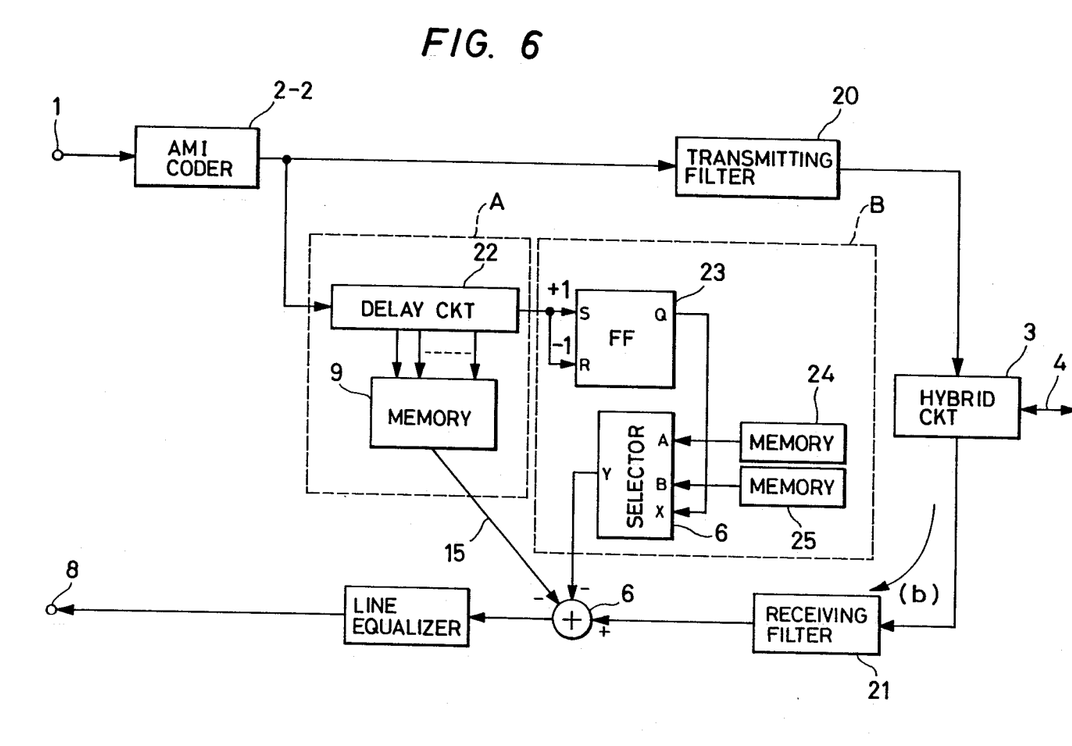

FIG. 6 illustrates another embodiment of an echo canceller to which the present invention pertains. In this embodiment, the AMI (Alternative Mark Inversion) code is used as the transmitting data.

The echo replica corresponding to the pattern in the limited N time slots is generated by structure A including the delay circuit 22 and the memory 9 which gives tap coefficient. The pattern series after the N time slots is divided into two groups by the flip-flop 23 in accordance with positive or negative mark ($+1$ or $-1$) appearing in the pattern after the N time slots considering the encoding rule of AMI. The result of the sorting may be obtained by an output of the flip-flop 23, the memories 24 and 25 storing the amount of echoes corresponding to the positive and negative groups are selected by the selector 26 and the second replica of echo is generated.

Figure 7:
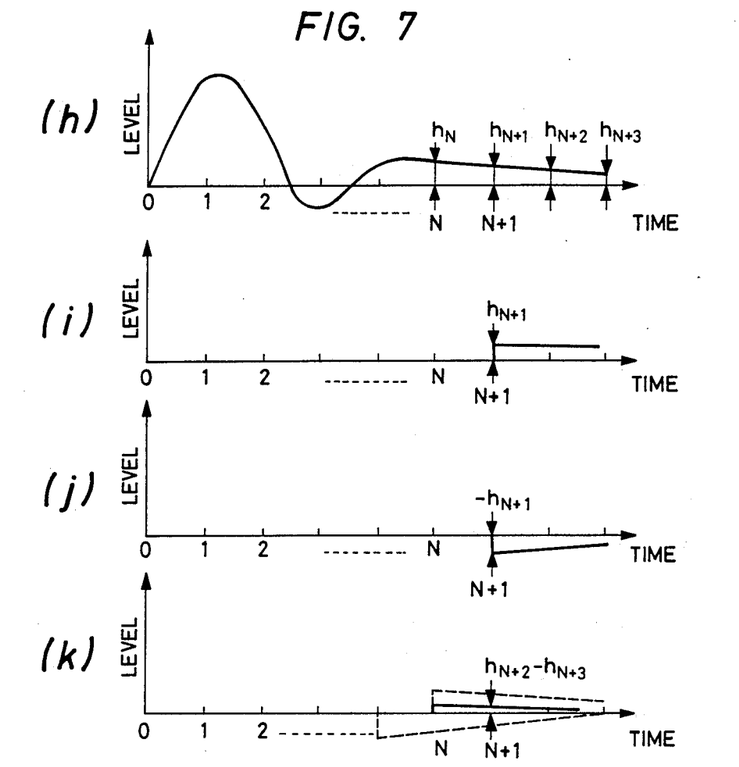
FIG. 7 illustrates waveforms for explaining operation of an embodiment shown in FIG. 5.

FIG. 7 illustrates waveforms for explaining operation of above embodiment and is substantially the same as FIG. 2. (h) is impulse response of echo and amplitudes of response after N time slots are assumed as $h_{N+1}$, $h_{N+2}$, ... The first replica of echo generator a of N time slots generates errors after $h_{N+1}$ as illustrated in (i). For example, when the pattern after the N time slots is indicated as ($-1, 0, 0, 0 \ldots$), an error in which the polarities of waveform of (i) are inverted is generated as indicated by (j). Moreover, the pattern ($-1, 1, 0, 0, \ldots$) generates the error of $h_{N+2} - h_{N+3}$ as indicated by (k). As described above, error by patern after the N time slots is distributed as indicated in FIG. 7 by the signal pattern. In the case of AMI code, the pulse appearing first after the N time slots is classified into a positive (P+) and negative (P−) pulse. In the embodiment shown in FIG. 6, the polarity of the pulse appearing after the N time slots of AMI signal is discriminated by the flip-flop 23 and the memories 24 and 25 storing the values $\Delta V/2$ and $-\Delta V/2$ corresponding to the polarity are selected by the selector 26. Thereby, the second replica of echo is generated.

The first and second replicas of echo thus obtained are applied to the adder 6 and it is subtracted from the echo. It is statistically equivalent to correction of unlimited tap length.

Figure 9:
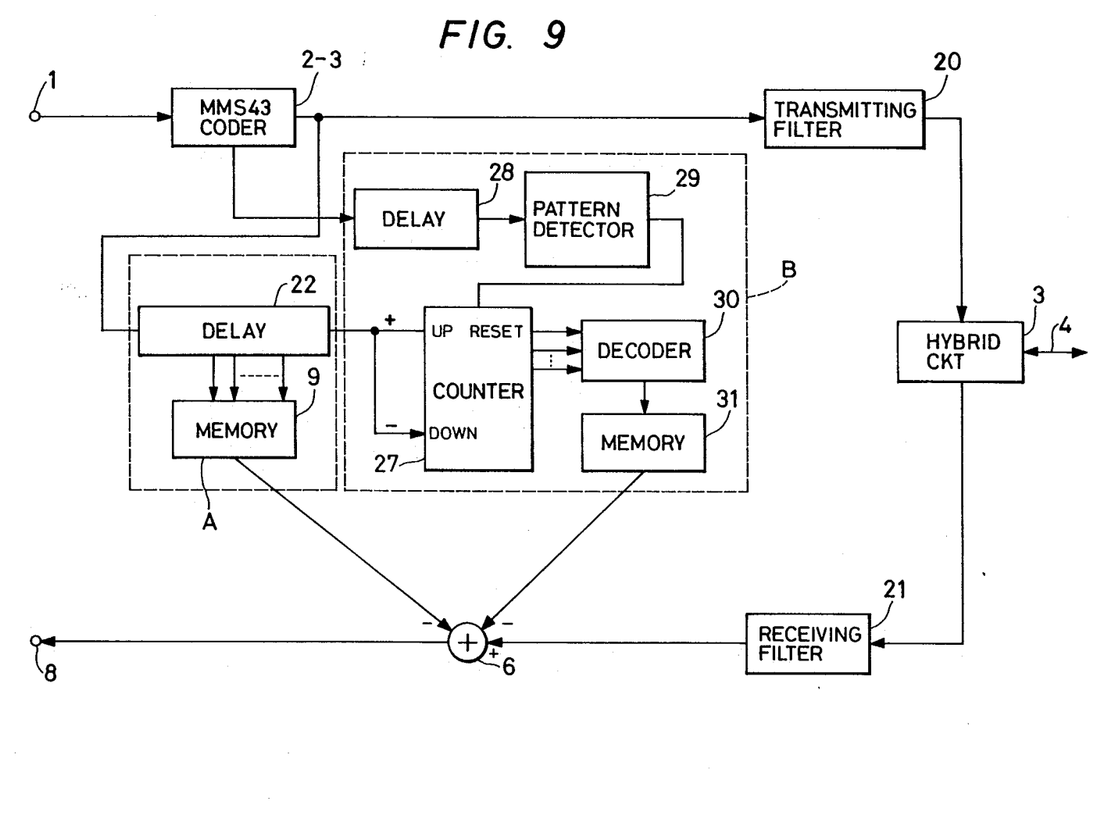
FIG. 9 is a block diagram illustrating another embodiment of the echo canceller of the present invention.
Figure 10:
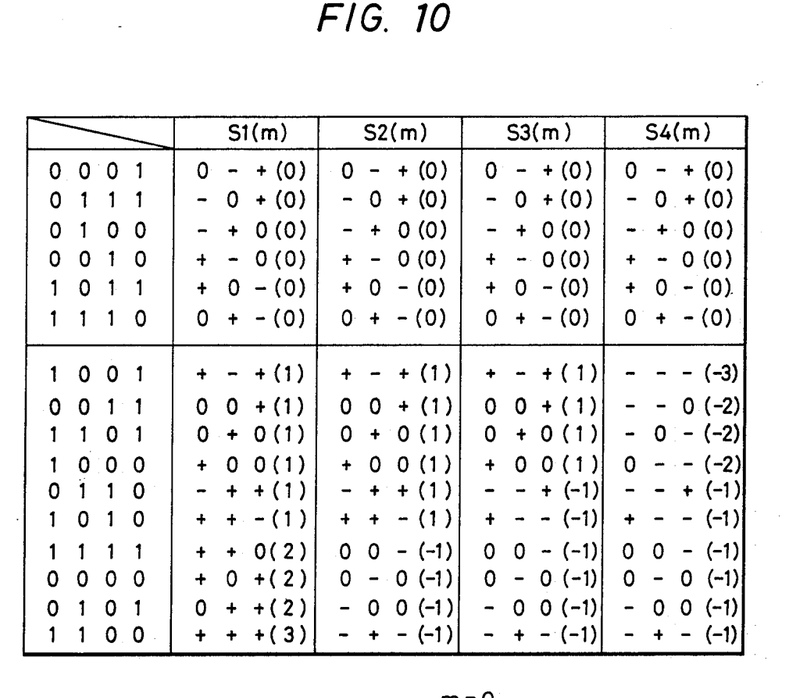
FIG. 10 illustrates relationship between the input code and output code of the encoder 2-3 used in the embodiment shown in FIG. 8.
Figure 11:
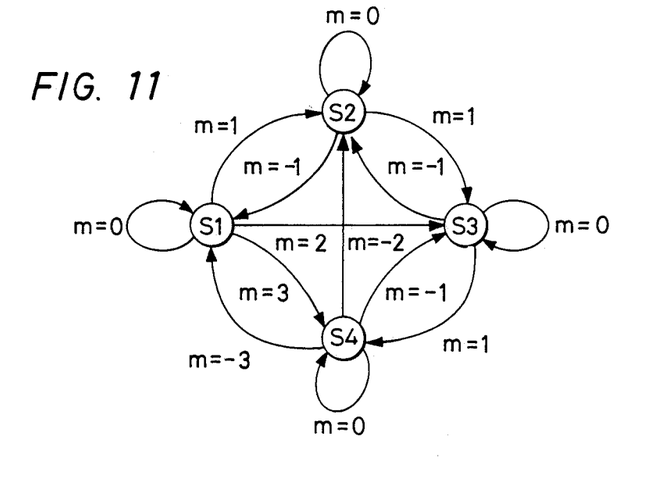
FIG. 11 illustrates a transition diagram indicating relationship between input code and output code shown in FIG. 10.

FIG. 9 illustrates a block diagram indicating the structure of another embodiment of an echo canceller to which the present invention pertains. In this embodiment, the MMS 43 coder (Modified Monitoring State 43) is used as the transmission data signal as indicated in FIG. 10. The encoding rule will be explained briefly. The data series of 0, 1 is blocked into four bits and these are converted to three values ($+, 0, -$) and three codes. In this case, there are four statuses of S1 to S4 and each code has a status transition value m which shows a sum of codes, for example, m becomes 0 for "$0-+$" or 3 for "$+++$". The transition of status of the enxt code in accordance with the value of m is indicated in the status transition diagram of FIG. 10. For example, the data series, 0010, 1001, 1111, is converted to $+-0$, $+-+00-$.

Figure 8:
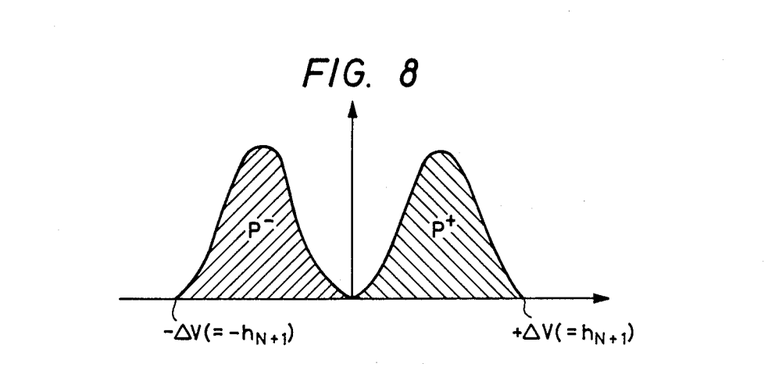
FIG. 8 illustrates relationship between residual echo and generation frequency.

The MMS 43 encoder 2-3 shown in FIG. 8 carries out the conversion. The delay circuit 28 delays a value of m of the encoder 2-3. The delay circuit 22 is shifted by the code rate $f_b$ but the delay circuit 28 is shifted by the rate $f_b/3$ of N/3. The up-down counter 27 sorts the code series after the N time slots and in this case the sign ($+$) means up-counting while the sign ($-$) means down-counting. It is counted how much deviated to positive or negative the code series after the N time slots is and it is sorted by the sorting method, for example, ($-3$ and $-2$), ($-1-+1$) and ($+2-+3$) and it is selected by the decoder 30 designating the address of memory 31. A method for eliminating the designated value from the input signal by the adder 6 and alteration of memory value are similar to that in the embodiment of AMI of FIG. 6 and explanation of these is omitted.

Moreover, in case the (code of $m=0$) of the delay circuit 28 and balanced code detector 24 continues for m or more, the amount of echo after the N time slots may be considered very small, it is desirable that the up- and down-counter 27 is reset.

We claim:

1. An echo canceller for cancelling an echo of a first digital data signal generated on a receive line in a circuit having a transmission line transmitting said first digital data signal, said receive line receiving a second digital data signal and a hybrid circuit through which said transmission line and said receive line are connected to a two-wire line, said echo canceller comprising:

first means for generating a first echo replica from said first digital data signal, said first echo replica corresponds to an initial part of said echo of a limited time length;

second means, including a first order recursive digital filter for filtering a delayed digital data signal obtained by delaying said first digital data signal by said limited time length and means for multiplying a coefficient to an output of said first order recursive digital filter, for generating a second echo replica corresponding to a residual part of said echo after said limited time length of said echo; and third means for subtracting said first and second echo replicas from said echo replicas from said echo on said receive line;

wherein said first order recursive filter comprises a delay element which has a delay time equal to a basic period of said first digital data signal, a feedback circuit which obtains a feedback signal by multiplying a feedback coefficient to an output of said delay element, an adder which adds said feedback signal and said delayed digital data signal and applies the output to said delay element, and an output means which generates at least the one of the input or output of said delay element as said output of said first order recursive digital filter.

2. An echo canceller according to claim 1, wherein said feedback coefficient to be multiplied to said output of said delay element is 1.

3. An echo canceller for cancelling an echo of a first digital data signal generated on a receive line in a circuit having a transmission line transmitting said first digital data signal, said receive line receiving a second digital data signal and a hybrid circuit through which said transmission line and said receive line are connected to a two-wire line, said echo canceller comprising:

first means for generating a first echo replica from said first digital data signal, said first echo replica corresponds to an initial part of said echo of a limited time length;

second means, including a first order recursive digital filter for filtering a delayed digital data signal obtained by delaying said first digital data signal by said limited time length and means for multiplying a coefficient to an output of said first order recursive digital filter, for generating a second echo replica corresponding to a residual part of said echo after said limited time length of said echo; and third means for subtracting said first and second echo replicas from said echo replicas from said echo on said receive line;

wherein said first order recursive filter includes a circuit which selectively outputs a value obtained by subtracting a constant value from an input signal of said first order recursive filter, when said input signal is positive, a value obtained by adding said constant value to said input signal when said input signal is negative, and a value of zero when said input signal is zero.

4. An echo canceller for cancelling an echo of a first digital data signal generated on a receive line in a circuit having a transmission line transmitting said first digital data signal, said receive line receiving a second digital data signal and a hybrid circuit through which said transmission line and said receive line are connected to a two-wire line, said echo canceller comprising:

first means for generating a first echo replica from said first digital data signal, said first echo replica corresponds to an initial part of said echo of a limited time length;

second means, including a first order recursive digital filter for filtering a delayed digital data signal obtained by delaying said first digital data signal by said limited time length and means for multiplying a coefficient to an output of said first order recursive digital filter, for generating a second echo replica corresponding to a residual part of said echo after said limited time length of said echo;

third means for subtracting said first and second echo replicas from said echo on said receive line; and fourth means for correcting a value of said coefficient when said first digital data signal has been transmitted with a predetermined data pattern by using a residual signal cancelled by said second echo replica through said subtracting means.

5. An echo canceller according to claim 4, wherein said first means includes means for delaying said first digital data signal by said limited time length, and said second means is connected to said first means to receive the output of said delaying means.

6. An echo canceller for cancelling an echo of a first digital data signal generated on a receive line in a circuit having a transmission line transmitting said first digital data signal, said receive line receiving a second digital data signal and a hybrid circuit through which said transmission line and said receive line are connected to a two wire line, said echo canceller comprising:

first means for generating a first echo replica corresponding to an initial part of said echo, said first means including a delay circuit having a plurality of taps and a first memory inputting outputs of said taps and producing said first echo replica, second means for generating a second echo replica corresponding to a residual part after said initial part of said echo, said second means including a flip-flop circuit for detecting polarity of an output signal of said delay circuit, a second memory for storing a plurality of residual echo replicas and selector for selecting one of said residual replicas in response to an output of said flip-flop circuit; and a third means for subtracting said first echo replica and said second echo replica from said echo of said first digital data signal generated on said receive line.

* * * * *